Figure 1:
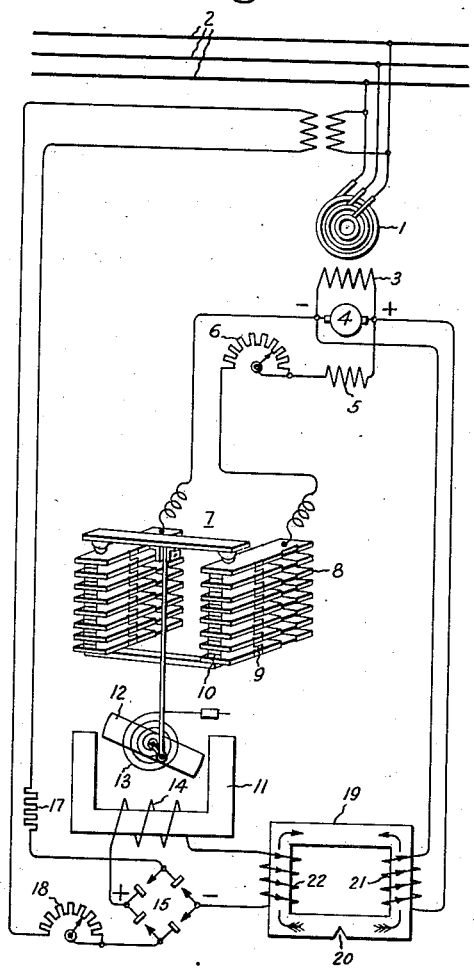

Aug. 13, 1940.　　　L. W. THOMPSON　　　2,211,612
ELECTRICAL REGULATING SYSTEM
Filed May 7, 1937　　　2 Sheets-Sheet 1

Inventor:
Louis W. Thompson,
by Harry E. Dunham
His Attorney.

Aug. 13, 1940.  L. W. THOMPSON  2,211,612
ELECTRICAL REGULATING SYSTEM
Filed May 7, 1937  2 Sheets-Sheet 2

Inventor:
Louis W. Thompson,
by Harry E. Dunham
His Attorney.

Patented Aug. 13, 1940

2,211,612

UNITED STATES PATENT OFFICE 2,211,612

ELECTRICAL REGULATING SYSTEM

Louis W. Thompson, Schenectady, N. Y., assignor to General Electric Company, a corporation of New York Application May 7, 1937, Serial No. 141,289

13 Claims. (Cl. 171—119)

My invention relates to electrical regulating systems and more particularly to improvements in anti-hunting means for electrical regulating systems.

This is a continuation-in-part of my application Serial No. 61,928, filed February 1, 1936, and assigned to the assignee of this application.

Most regulating systems inherently tend to overshoot or hunt, so that although the regulated quantity may have a fixed average value its instantaneous value fluctuates more or less widely. This hunting action is usually caused by a time lag in the operation of the regulator.

Heretofore, inductive stabilizing means of anti-hunting means, in the form of a transformer having a winding responsive to the operation of the regulator for inducing a transient voltage in another winding which applies a corrective bias to the controlling means of the regulating system, have been known.

In accordance with my invention, I provide a novel anti-hunting transformer circuit of the above type having a number of improved features. One of these features is that the two windings of the transformer are both energized with direct current and the windings are so arranged as to produce opposed magneto-motive forces which, during at least a portion of the normal operating range of the regulating system, are substantially equal in effect. As a result, the core of the anti-hunting transformer will normally be relatively unsaturated by the direct current excitation and consequently relatively slight changes in current or voltage applied to one of the windings will produce an appreciable induced voltage in the other winding, thereby producing a very sensitive anti-hunting transformer.

It is difficult, if not impossible, to have the magneto-motive forces of the two coils always substantially equal and opposite. Consequently, there are times when there is an appreciable net direct current produced magneto-motive force in one direction or the other in the core, which magneto-motive force tends to produce magnetic saturation in the core. In order further to correct for this tendency towards saturation, I provide the core of the transformer with a portion having a restricted cross section, such for example as a notch in one side of the core. With such an arrangement the anti-hunting transformer can be made of small size and therefore at relatively low cost because at low values of a net direct current produced magneto-motive force for producing flux in the core, the restricted section will be unsaturated so that the transformer will be sensitive to small changes in flux therein while at relatively large values of flux in the core, produced by relatively large values of net magneto-motive force, the restricted section will saturate so that the majority of the flux will have to traverse an air gap, thereby preventing saturation of the remainder of the core and keeping the transformer sensitive in operation.

In order that my anti-hunting means may be still more sensitive in operation, I energize the main control coil or magnet of the regulating means through a full wave rectifier and connect the winding of the anti-hunting transformer which produces a transient corrective bias in series with the main control coil on the direct current or output side of the rectifier. In this way, current changes produced by the corrective bias need not flow through the entire external energizing circuit for the main control coil but may merely circulate in a local circuit including the control coil of the rectifier and the bias producing coil of the anti-hunting transformer.

An object of my invention is to provide an improved electrical regulating system.

Another object of my invention is to provide a new and improved anti-hunting means for an electrical regulating system.

A further object of my invention is to provide a novel and improved stabilizing or anti-hunting transformer for an electrical regulating system.

My invention will be better understood from the following description taken in connection with the accompanying drawings and its scope will be pointed out in the appended claims.

Figure 2:
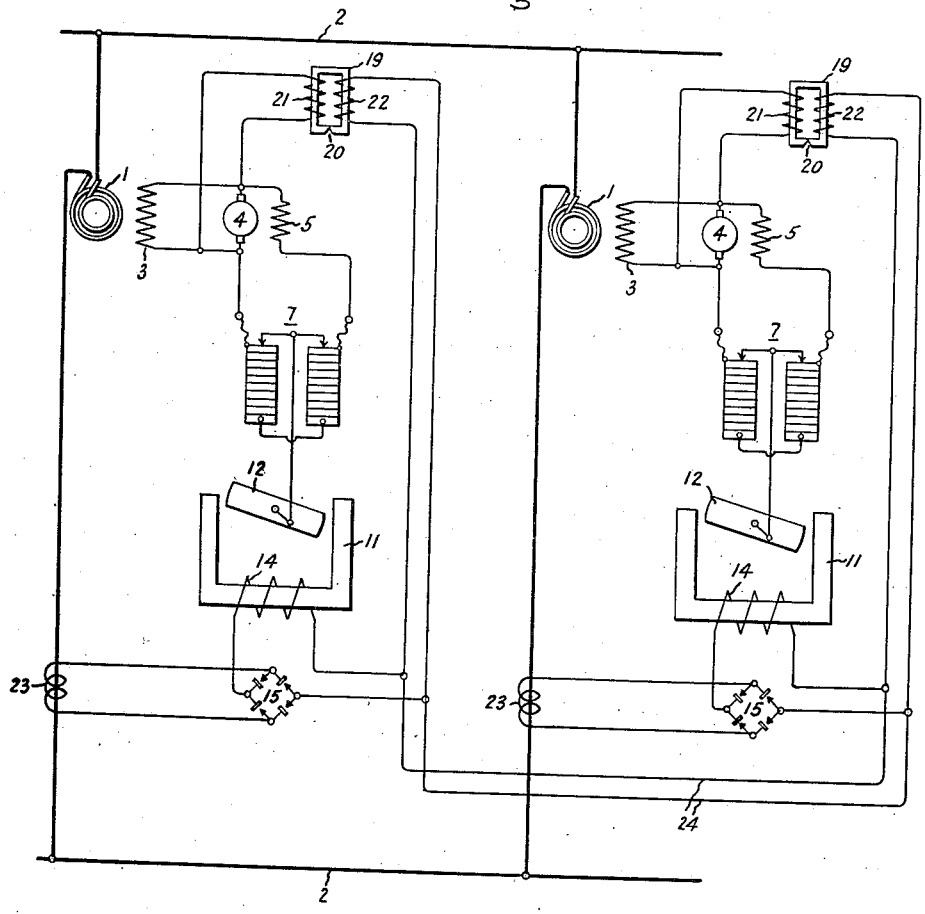

In the drawings, Fig. 1 illustrates diagrammatically an embodiment of my invention applied to a direct acting rheostatic type voltage regulator for a single alternating current generator and Fig. 2 is a modification wherein my invention is adapted for use with parallel current regulated generators.

Referring now to Fig. 1, I show therein an alternating current generator or alternator 1 which is connected to supply power to an external load circuit 2. Alternator 1 is provided with a field winding 3 which is energized by a self-excited exciter 4 having a shunt field winding 5. In series with the field winding 5 of the exciter is an ordinary exciter field rheostat 6 and a variable regulating resistance 7. So far as my invention is concerned, the resistance 7 may be of any type and it is shown by way of example as the special variable resistance device, various features of which are disclosed and claimed in my Patent 2,026,405, issued December 31, 1935, and in my application, Serial No. 57,540, filed December 2, 1935, as a continuation in part of an original application filed November 25, 1933. Both the above-mentioned patent and the above-mentioned application are assigned to the assignee of the present application. Resistance 7 is shown in the form of two serially connected stacks consisting of alternate elements of different material such as long elements 8 of carbon interleaved with short elements 9 of a nickel-iron alloy known as Nichrome. The contact or surface resistance between these different materials is relatively high and means consisting of metal contacts 10 passing through the outer ends of the carbon members 8 are adapted successively to short circuit these contact resistances as a downward tilting force is applied to the outer ends of the stacks of the resistor 7. This force is applied through a lever system by means of an electromagnet consisting of a core 11 and a pivotally mounted armature 12. A spring 13 tends to oppose the pull of the magnet and to release the tilting force on the resistance stack. Core 11 is energized by a main control coil 14 which is energized in response to any suitable electrical quantity to be regulated, such, for example, as the voltage of generator 1. Interposed between the generator 1 and the main control coil 14 is a full wave rectifier 15 which may be of any suitable type such as the well known copper oxide variety. The usual current limiting and frequency error correcting resistor 17 is inserted in series with the alternating current input terminals of the rectifier and there is also inserted in series therewith an adjustable rheostat 18 for adjusting the voltage setting of the regulator.

For preventing hunting of the above-described regulating system, I provide an anti-hunting transformer comprising a core 19 having a portion with a restricted cross section indicated, by way of example, as a notch 20. Wound on the core is a primary coil 21 connected to have its energization varied in accordance with the operation of the regulator and as shown it is connected across the terminals of the exciter 4. Also wound on the core 19 is a secondary winding 22 which is connected to apply a transient corrective or anti-hunting bias to the control coil 14. As shown, this coil 22 is connected in series with the control coil 14 on the output or direct current side of the rectifier 15.

From the above-described arrangement it will be seen that both the windings 21 and 22 carry direct current. They are so wound on the core 19 relative to each other that their magnetomotive forces are in opposition. In other words, the flux produced by one coil tends to be neutralized by the flux produced by the other coil.

As coil 14 is the main control coil of the regulator, the action of the entire system is always such as to tend to maintain substantially constant current in this coil for if the current increases above the normal value, the increased flux in the core 11 will cause the armature 12 to rotate through a counterclockwise angle in opposition to the torque of the spring 13 thereby releasing the tilting force on the resistance 7 whereby the effective resistance of resistance 7 is increased, thereby decreasing the voltage of the exciter 4, which in turn decreases the excitation of the generator 1, thereby decreasing its voltage with the result that the current in the coil 14 decreases. Similarly, if the current in the coil 14 tends to fall below the normal value the torque of the spring 13 becomes greater than the magnetic pull on the armature 12 so that the armature rotates through a clockwise angle thereby causing the contacts 10 to short circuit more of the resistance 7 thereby increasing the voltage of exciter 4 and in turn increasing the voltage of the generator 1. This increase in generator voltage obviously tends to increase the current in the coil 14.

However, as the current in the coil 21 is produced by the voltage of the exciter 4 the current in this coil will not be constant because different values of load on the generator 1 will require different amounts of excitation in order that constant terminal voltage be maintained. However, in most generator voltage regulating systems, there is a substantially normal or average operating condition or load and by making the ampere turns of the coil 21 for this average condition of operation, which condition will of course also correspond to an average or normal exciter voltage, substantially equal and opposite to the substantially constant ampere turns in the coil 22 there will be under this normal condition little or no flux in the core 19.

The operation of my system is such that when a voltage change occurs at the terminals of the generator 1 and the regulator responds to increase or decrease, the voltage of the exciter 4, as the case may be, a transient voltage or bias is induced in the coil 22 by the flux produced by the change in energization of the coil 21 in response to the change in exciter voltage. This transient biasing voltage of course occurs only while the exciter voltage is changing and in proportion to the rate of change of the exciter voltage. This biasing voltage is applied in the local circuit including the coil 14 and the rectifier 15 and is in such direction as to tend to restore the current in the main control coil 14 to its normal value, for example, if the voltage of the generator 1 decreases the current in the coil 14 decreases, as has been previously described, and this causes the regulator to increase the exciter voltage. Under these conditions the voltage bias in the coil 22 has such polarity as to increase the current in the local circuit through the coil 14 and the rectifier 15. Consequently, the regulator tends to come back to its steady state equilibrium position before the regulating change has been completed, thereby preventing overshooting. Similarly, when the voltage of generator 1 increases above normal the decrease in exciter voltage causes an opposite polarity transient voltage to be induced in the winding 22 thereby tending to reduce the current in the coil 14 to the normal value.

Because of the rectifier 15 the change in current in the coil 14 produced by the winding 22 does not have to flow through the entire external circuit including the adjustable rheostat 18, the series resistor 17 and the alternator 1. Consequently, the anti-hunting circuit is much more sensitive and quicker in action.

The function of the restricted section 20 is to prevent saturation of the core 19 while at the same time permitting the transformer to be of relatively small size for its sensitivity. During relatively low values of flux in the core 19, the restricted section is not saturated so that small changes in current in the winding 21 produce relatively quick and proportionate voltage changes in the winding 22 because while the flux is low in value, the restricted section 20 is unsaturated.

However, if there were no restricted section and an air gap were substituted then for low values of flux it would require an excessively large transformer in order to get the necessary sensitiveness and degree of response or induced voltage in the winding 22. However, during light or very heavy load on the generator 1 or at other times when there tends to be a relatively large unidirectional flux in the core 19 the restricted section saturates before the remainder of the core 19 saturates so that a substantial proportion of the flux will traverse an air gap thereby preventing saturation of the remainder of the core 19. In this manner, the transformer is still sensitive in operation even though the core is carrying relatively high value of unidirectional flux.

Although I have shown my invention by way of example as applied to a voltage regulator for an alternating current generator, it should be understood that so far as my anti-hunting circuit is concerned it is equally applicable to a regulator of any suitable quantity. It is also immaterial to my invention whether or not the regulated apparatus is a dynamo-electric machine or whether the electric circuit for varying the regulated quantity is a dynamo-electric machine excitation circuit or not.

I have found that when generators which are provided with stabilizing transformers are operated in parallel that operating difficulties are often experienced. It appears that the regulators would swing in periods which are entirely different. This would cause a current between the generators which would increase and decrease until one generator was automatically tripped off the line in response to either reverse current or overload.

I have found however that by paralleling the secondaries of the stabilizing transformers this difficulty was overcome and the regulators will not swing in different periods. Such a connection is shown in Fig. 2 wherein the generators are shown for simplicity's sake as single phase generators 1 connected in parallel between the lines of a main circuit 2. The automatic regulators are connected to respond to the current in the individual machines by means of current transformers 23. The paralleling connection between the secondary windings of the stabilizing transformers is shown at 24.

Individual regulators and their stabilizers act as they do in Fig. 1 except that as the response is to current instead of voltage each regulator tends to hold constant current in its associated machine. By means of the paralleling connection 24 a swing of either one of the regulators tending to increase or decrease the excitation of its associated exciter or main generator will be reflected in the operation of the other regulator with the result that the system is entirely stable in operation.

While I have shown and described a particular embodiment of my invention, it will be obvious to those skilled in the art that changes and modifications can be made therein without departing from my invention and I therefore aim in the appended claims to cover all such changes and modifications as fall within the true spirit and scope of my invention.

What I claim as new and desire to secure by Letters Patent of the United States is:

1. In combination, apparatus having a variable quantity to be regulated, an electric circuit for varying said quantity, means including a control electromagnet for controlling said circuit, a full wave rectifier connected to said apparatus for energizing said magnet with direct current in accordance with the value of said quantity, and antihunting means for applying between said control magnet and said rectifier a transient bias which varies in accordance with the rate of change of an electrical condition of said circuit.

2. In combination, apparatus having a variable electrical quantity to be regulated, a dynamo-electric machine excitation circuit for controlling said quantity, means including a control coil for controlling the voltage of said excitation circuit, a full wave rectifier connected to said apparatus for energizing said coil with direct current in accordance with the value of said quantity, and antihunting means for introducing between said control coil and said rectifier a transient electrical bias in the energization of said control coil which varies with the rate of change in voltage of said excitation circuit.

3. In combination, apparatus having a variable electrical quantity to be regulated, a dynamo-electric machine direct current excitation circuit for controlling said quantity, means including a control coil for controlling the voltage of said excitation circuit, a full wave rectifier connected to said apparatus for energizing said coil with direct current in accordance with the value of said quantity, and antihunting means for introducing between said control coil and said rectifier a transient series voltage which varies in accordance with the rate of change of voltage of said excitation circuit.

4. In a dynamo-electric machine direct current excitation controlling type regulating system, a main control coil energized through a full wave rectifier, and an antihunting transformer having one winding connected to respond to variations in excitation and having another winding connected in series with said main control coil on the direct current side of said rectifier, said windings being connected so as normally to produce opposed magnetomotive forces in said transformer.

5. In an electrical regulating system, a dynamo-electric generator having an excitation circuit, an automatic regulator for said generator, said regulator having a control coil connected to be responsive to an operating condition of said generator, said regulator also having means for varying the voltage of said excitation circuit, and an antihunting transformer having a magnetic core provided with two windings connected respectively to said excitation circuit and to said control coil, said windings being arranged normally to produce substantially equal and opposite magnetomotive forces in said core.

6. In an electrical regulating system, a dynamo-electric generator having an excitation circuit, an automatic regulator for said generator, said regulator having a control coil connected to be responsive to an operating condition of said generator, said regulator also having means for varying the voltage of said excitation circuit, and an antihunting transformer having a magnetic core provided with two windings connected respectively to said excitation circuit and to said control coil, said windings being arranged normally to produce substantially equal and opposite magnetomotive forces in said core, a portion of said core having a section which becomes magnetically saturated by a lower value of core flux than is required for saturation of the remainder of said core.

7. In combination, an alternator having a field winding, an exciter for said field winding, a variable resistor for controlling the voltage of said exciter, means including a control coil for varying said resistor, a full wave rectifier for connecting said control coil to respond to the voltage of said alternator in such a manner as to cause automatic regulation of the voltage of said alternator, and an antihunting transformer having a core on which are wound two opposed direct current windings connected respectively across said exciter and in series with said control coil on the direct current side of said full wave rectifier, said coils being so connected that an increase in voltage of said exciter increases the voltage applied to said control coil and a decrease in voltage of said exciter decreases the voltage applied to said control coil.

8. In combination, an alternator having a field winding, a self-excited exciter for said field winding, a variable resistor for controlling the voltage of said exciter, means including a control coil for varying said resistor, a full wave rectifier for connecting said control coil to respond to the voltage of said alternator in such a manner as to cause automatic regulation of the voltage of said alternator, and an antihunting transformer having a core on which are wound two opposed direct current windings connected respectively across said exciter and in series with said control coil on the direct current side of said full wave rectifier, said core having a portion with reduced cross section which saturates magnetically at a lower value of flux than is required to saturate the remainder of said core.

9. In combination, a power circuit, a pair of dynamo-electric machines connected in parallel to said power circuit, a separate excitation circuit for each machine, a separate automatic regulator for each machine for controlling its excitation circuit, a separate stabilizing transformer for each regulator, each stabilizing transformer having a primary winding connected to respond to the excitation circuit controlled by its associated regulator and having a secondary winding connected to bias its associated regulator, and means for connecting the secondary windings of said stabilizing transformers in parallel.

10. In combination, a power circuit, a pair of dynamo-electric generators connected in parallel to said power circuit, a separate excitation circuit for each generator, a separate direct acting rheostatic regulator for each generator for controlling its excitation circuit in accordance with an operating condition of its associated machine, a separate stabilizing transformer for each regulator, each stabilizing transformer having a primary winding connected to respond to the excitation circuit controlled by its associated regulator having a secondary winding for producing an antihunting bias with respect to its associated regulator, paralleling connections between the secondary windings of said stabilizing transformers.

11. In combination, apparatus having a variable electrical quantity to be regulated, a controlled electric circuit for varying said quantity, a control circuit including a control electromagnet for controlling said controlled circuit, antihunting means for inserting in said control circuit a transient voltage which varies in accordance with the rate of change of an electrical condition of said controlled circuit, and means connected in said control circuit for confining the current produced by said transient voltage to a local circuit which includes said control electromagnet and which excludes the remainder of said control circuit.

12. In combination, apparatus having a variable electrical quantity to be regulated, a dynamo-electric machine excitation circuit for controlling said quantity, a control coil for controlling the voltage of said excitation circuit, a relatively high impedance connected in series with said control coil, antihunting means for introducing a transient electrical bias in the energization of said control coil which varies with the rate in voltage of said excitation circuit, and electric valve means for confining the effect of said electrical bias to said control coil while rendering it impossible for said electrical bias to effect the current in said relatively high impedance.

13. In a regulator system, a dynamo-electric machine, a voltage regulator for said machine for controlling the excitation thereof in response to changes in machine voltage, said regulator having a control winding connected to respond to the voltage of said machine through a relatively high impedance whereby the voltage of said winding is substantially less than the voltage of said machine, antihunting means for inserting in series with said control winding a transient potential which is proportional to the rate of change of excitation of said machine, and asymmetrical conducting means connected in circuit with said control winding and said impedance for causing said transient bias to act on a local circuit which includes said control winding and which excludes said impedance.

LOUIS W. THOMPSON.

CERTIFICATE OF CORRECTION.

Patent No. 2,211,612. August 13, 1940.

LOUIS W. THOMPSON.

It is hereby certified that error appears in the printed specification of the above numbered patent requiring correction as follows: Page 2, second column, line 42, for "value, for" read --value. For--; page 4, second column, line 33, claim 12, after "rate" insert --of change--; and that the said Letters Patent should be read with this correction therein that the same may conform to the record of the case in the Patent Office.

Signed and sealed this 8th day of October, A. D. 1940.

(Seal)

Henry Van Arsdale,
Acting Commissioner of Patents.